3,160,030
CONTROL MEANS FOR EPICYCLIC POWER TRANSMISSION MECHANISMS
Axel C. Wickman, 14 Hibiscus Drive, Hibiscus Island, Miami Beach, Fla.
Filed Oct. 18, 1960, Ser. No. 63,322
Claims priority, application Great Britain Nov. 30, 1959
15 Claims. (Cl. 74—761)

This invention relates to epicyclic power transmission mechanisms for road vehicles or other purposes, of the kind which include two elements either of which can be used for imparting driving motion to the mechanism.

One object of the invention is to enable either of the driving elements of such an arrangement to be connected to an engine or other power source in a simple and convenient manner.

A further object is to provide control means enabling a drive to be connected alternatively to either of two coaxial drive shafts. A still further object is to provide control means which enable the alternative drive to be connected with sustained power, i.e. so that as the alternative drive is connected the existing drive is smoothly disconnected.

A control means in accordance with the invention comprises essentially a driving clutch member having an inner peripheral surface of frustro-conical form, a pair of complementary driven clutch members of different diameters for frictional engagement with the said inner surface of the driving clutch member and respectively adapted to actuate the driving elements of the transmission mechanism, and means for engaging the driven clutch members with the driving clutch member.

Figure 1:
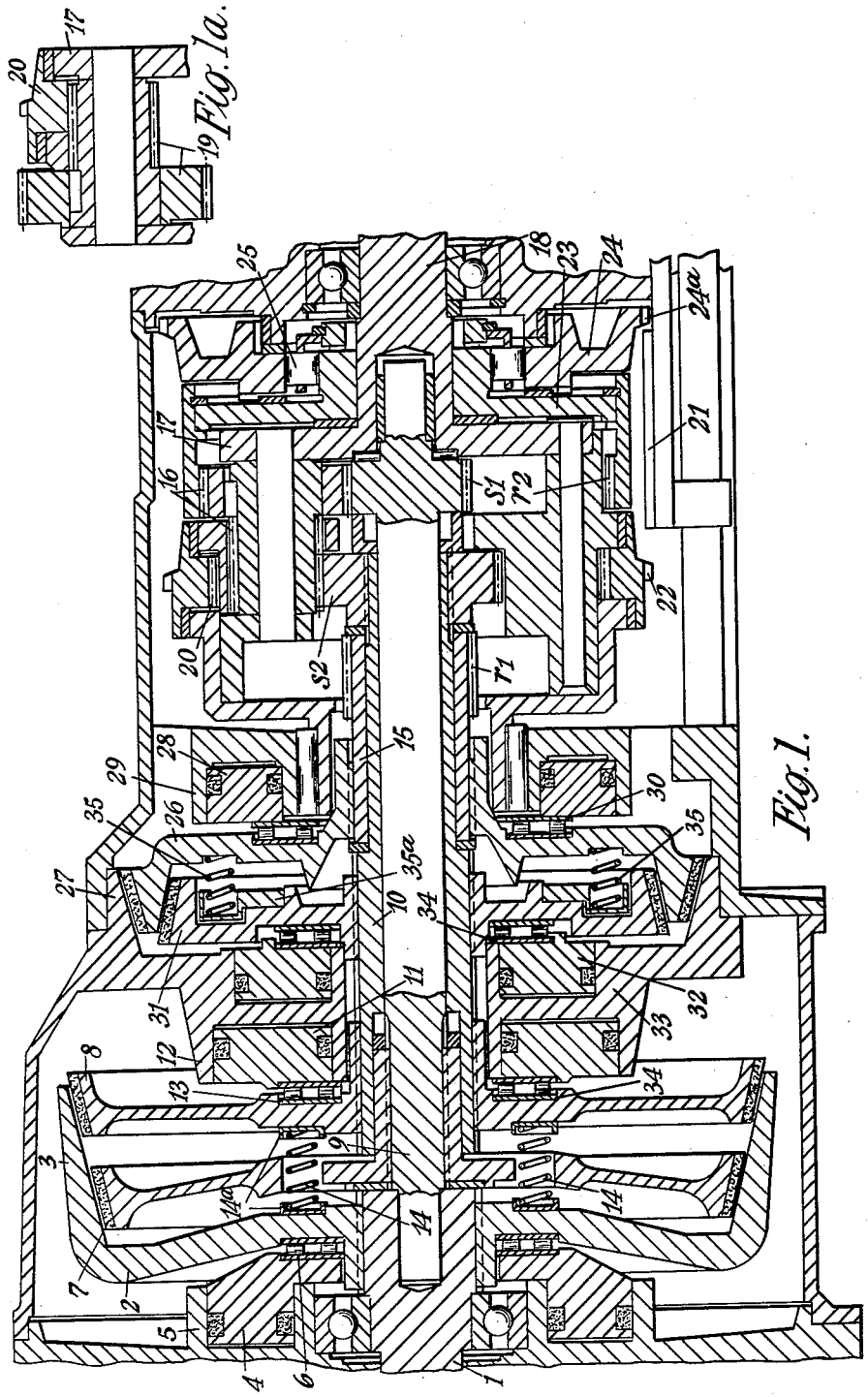
FIGURE 1 is a longitudinal section illustrating a control means in accordance with the invention for use with a 5-speed epicyclic mechanism, FIGURE 1a being a supplementary view illustrating a portion of the epicyclic mechanism.

With reference to FIGURE 1, the engine-driven shaft 1 has secured to it with axial freedom of movement, a driving clutch member 2 on which is formed a laterally extending flange 3 having an inner peripheral surface of frustro-conical form. This member is movable axially by a hydraulically operable annular piston 4 contained in an annular cylinder 5 formed in the housing of the mechanism. The piston acts on the clutch member 2 through a thrust ring 6.

Within the said driving clutch member 2, are contained two complementary driven clutch members 7, 8 having frusto-conical peripheries of different diameters adapted for frictional engagement with the inner surface of the peripheral part of the clutch 2. The clutch member 7 is secured to the primary input shaft 9 of the epicyclic mechanism to be driven by the clutch, and the clutch member 8 has an axially slidable connection with the secondary input shaft 10 of the mechanism, the shaft 10 being in the form of a sleeve which is mounted on the primary input shaft 9. The clutch member 8 is movable axially by a hydraulically operable annular piston 11 which is contained in an annular cylinder 12 and which acts on the clutch member 8 through a thrust ring 13.

Between the clutch members 2 and 8 are arranged a spring or springs 14 which pass through apertures in the clutch member 7, and abut against thrust rings 14a.

The arrangement is such that engagement of the driving clutch member 2 with the driven clutch member 7 is effected by the piston 4, the driven clutch member 8 being concurrently moved away from the clutch member 2 by the springs 14. Engagement of the driven clutch member 8 with the driving clutch member 2 is effected by the piston 11, the clutch member 2 being concurrently moved away from the driven clutch member 7 by the pressure exerted on the clutch member 8 by the piston 11, which pressure overcomes the pressure exerted on the member 2 by the piston 4.

In the clutch construction shown in FIGURE 1, the portion of the frusto-conical peripheral flange 3 of smaller diameter is adjacent to the disc 2. But if desired the portion of larger diameter may be adjacent to the said disc, in which case the driven clutch member 7 is of larger diameter than the driven clutch member 8.

The particular form of epicyclic mechanism shown in FIGURE 1, to be controlled by the above described clutches, is a 5 speed and reverse motion mechanism. It comprises a sun pinion $s1$ formed on or secured to the primary input shaft 9, and a sun pinion $s2$ formed on or secured to the secondary input shaft 10. On a sleeve 15 carried by the secondary input shaft 10 is formed or secured a reaction pinion $r1$ which is controlled by hydraulically operable clutches to be hereinafter described. The sun pinions S1, S2, engage compound planet pinions 16 mounted on a planet pinion carrier 17 which is formed on or secured to the output shaft 18. The planet pinions 16 engage compound planet pinions 19 (FIGURE 1a) which engage the reaction sun pinion $r1$, and also engage a reverse-motion internally toothed annulus 20, which can be held against rotation by a slidable pawl 21 under the control of the driver, which pawl can be engaged with teeth 22 on the said annulus. Also the planet pinions 16 are engaged by an internally toothed reaction annulus $r2$, formed on or secured to a disc 23 which is connected to a disc 24 through a unidirectional clutch 25. The disc 24 has formed on it peripheral teeth 24a which can be engaged by the pawl 21 under the control of the driver.

The above mentioned means for controlling the reaction pinion $r1$, comprises a clutch member 26 attached to the sleeve 15 and adapted for frictional engagement with a complementary fixed clutch member 27 provided on the housing of the mechanism. The said member 26 is movable into engagement with the member 27 by a hydraulically operable annular piston 28 contained in a cylinder 29 and acting on the clutch member 26 through a thrust ring 30. Further there is slidably connected to the secondary input shaft 10 a clutch member 31 adapted for frictional engagement with the clutch member 26, by an annular hydraulically operable piston 32 contained in a cylinder 33 and acting on the said clutch member through a thrust ring 34. Between the clutch members 26 and 31 is arranged one or more springs 35 and an annular thrust plate 35a.

The mode of action is as follows:

To obtain the first forward speed the driven clutch member 7 is engaged with the driving clutch member 2 for imparting motion to the sun pinion $s1$, and the reaction annulus $r2$ is held against rotation by engagement of the pawl 21 with the teeth 24a.

The second speed is obtained by engaging the driven clutch member 8 with the driving clutch member 2 for imparting motion to the sun pinion $s2$, the reaction member $r2$ remaining locked by the pawl 21.

To obtain the third speed, the sun pinion $s1$ is driven by interengagement of the clutch members 2, 7, and the reaction sun pinion $r1$ is held against rotation by engagement of the clutch member 26 with the clutch member 27.

The fourth speed is obtained by engaging the clutch member 8 with the clutch member 2 for imparting rotation to the sun pinion $s2$, the reaction pinion $r1$ remaining locked.

To obtain the fifth speed, the clutch members 26, 31 are interlocked, the member 26 being released from the fixed clutch member 27, so interlocking the sun pinion s2 and the reaction pinion r1.

Reversal of the rotation of the output shaft is effected by causing the primary output shaft to rotate the sun pinion s1 and by locking the annulus 20 by the pawl 21.

Figure 2:
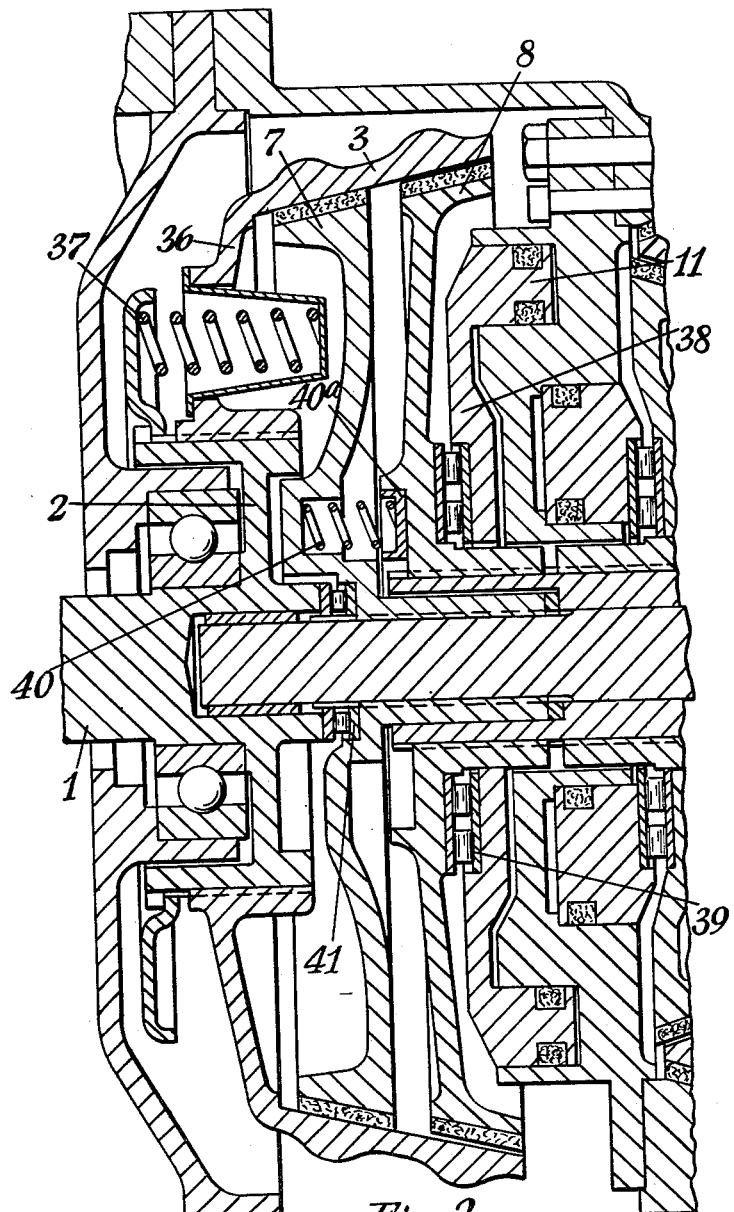
FIGURE 2 is a sectional view illustrating an alternative form of the control means shown in FIGURE 1.

Reverting now to the engine-driven control clutch above described, the invention is not restricted to the particular arrangement shown in FIGURE 1, as an alternative arrangement, such as shown in FIGURE 2, may be employed. In this arrangement the engine-driven shaft 1 has formed on it a disc 2, and on the periphery of the latter is mounted with axial freedom of movement a disc 36 from which extends the frustro-conical flange 3, the part 36 being movable relatively to the part 2 by a spring or springs as 37. The driven clutch member 8 is movable hydraulically into engagement with the driving clutch member 3 as above described by a piston 11 formed on a disc 38, a thrust ring 39 being arranged between the disc 38, and the clutch member 8. Between the driven clutch members 7 and 8 is arranged a spring or springs 40, and a thrust ring 40a.

The arrangement is such that the driving clutch member 3 is moved into engagement with the driven clutch member 7 by the spring 37, the clutch member 8 being disengaged from the member 3 by the springs 40. To engage the driven clutch member 8 with the driving member 3, the piston 11 is brought into action, and the consequent axial movement given to the member 3 releases it from the member 7, the latter being then held against axial movement by a thrust ring 41 located between it and the part 2 on the shaft 1.

Further, whilst the engine driven control clutch has been above described for controlling a 5-speed and reverse epicyclic mechanism, the invention is not restricted to such use as it may be applied to other arrangements of epicyclic mechanisms which include two sun pinions or other elements either of which can be used for imparting driving motion to the mechanism.

Having thus described my invention what I claim as new and desire to secure by Letters Patent is:

1. Control means for connecting a drive alternatively and selectively to either of two coaxial drive shafts, comprising an axially movable driving clutch member having an inner peripheral clutch surface, two axially spaced driven clutch members each with an outer peripheral clutch surface for clutching engagement with said inner clutch surface and respectively connected in the drive sense with said drive shafts, one of said driven clutch members being axially movable and the other located in the axial sense, and means to produce axial movements of said axially movable clutch members in opposite directions so that said driving clutch member can be moved into clutching engagement with the axially located driven clutch member to connect the drive to one of said drive shafts, and the axially movable driven clutch member can then be moved into clutching engagement with the driving clutch member to connect the drive to the other of said drive shafts in such manner that the driving clutch member is simultaneously displaced out of clutching engagement with the axially located driven clutch member.

2. Control means according to claim 1, wherein said drive shafts are arranged one within the other, said axially located clutch member is fixed to the inner of said drive shafts, and said axially movable driven clutch member is slidably mounted on the outer of said drive shafts while rotationally coupled thereto.

3. Control means according to claim 2, wherein said drive shafts are respectively connected to two elements of an epicyclic power transmission mechanism either of which can transmit the drive to the mechanism.

4. Control means according to claim 3, wherein said elements are sun pinions of the epicyclic mechanism, said sun pinions being of different effective diameters.

5. Control means for connecting a drive alternatively to either of two coaxial drive shafts, comprising an axially movable driving clutch member with an inner peripheral clutch surface, two axially spaced coaxial driven clutch members each with an outer peripheral clutch surface for clutching engagement with said inner clutch surface, the driven clutch members being of different effective diameters and the smaller being fixed in the axial sense while the other is axially movable, spring means urging said driving clutch member and and the axially movable driven clutch member apart to positions in which all said members are free from clutching engagement, first fluid-pressure operated means to move said driving clutch member axially into clutching engagement with the axially fixed driven clutch member without engaging the axially movable driven clutch member, and second fluid-pressure operated means to move the axially movable driven clutch member into clutching engagement with said driven clutch member in a manner which overcomes said first fluid-pressure operated means and displaces said driving clutch member to produce simultaneous disengagement of the latter from the axially fixed driven clutch member.

6. Control means according to claim 5, wherein said first and second fluid-pressure operated means respectively comprise annular pistons of different effective diameters.

7. Control means for connecting a drive alternatively to either of two coaxial drive shafts, comprising an axially movable driving clutch member with an inner peripheral clutch surface, two axially spaced coaxial driven clutch members each with an outer peripheral clutch surface for clutching engagement with said inner clutch surface, the driven clutch members being of different effective diameters and the smaller driven clutch member fixed in the axial sense while the other is axially movable, spring means urging said driving clutch member towards the axially fixed clutch member for clutching engagement with the latter while free from the other driven clutch member in an inoperative position of the latter, further spring means for urging the axially movable driven clutch member to said inoperative position, and fluid-pressure operated means to move the axially movable driven clutch member into clutching engagement with the driving clutch member in a manner which simultaneously displaces the driving clutch member from the axially fixed clutch member against the action of said first-mentioned spring means.

8. Control means according to claim 7, wherein said fluid-pressure operated means comprise an annular piston which acts on the axially movable driven clutch member.

9. An epicyclic power transmission mechanism comprising an input shaft, two alternative driving elements, control means for connecting said input shaft alternatively to either of said driving elements, an output shaft, and two epicyclic gear trains respectively coupling said driving elements to said output shaft, said control means comprising an axially movable driving clutch member having an inner peripheral clutch surface of generally conical form mounted on said input shaft, two axially spaced driven clutch members each with an outer peripheral clutch surface of generally conical form for clutching engagement with said inner clutch surface and respectively connected in the drive sense with said driving elements, said driven clutch members being of different effective outer diameter and one thereof being axially movable and the other located in the axial sense, and means to produce axial movements of said axially movable clutch members in opposite directions so that said driving clutch member can be moved into clutching engagement with the axially located driven clutch member to connect the drive to one of said driving elements, and the axially movable driven clutch member can then be moved into clutching engagement with the driving clutch member to connect the drive to the other of said driving members in such manner that the driving clutch member is simultaneously displaced out of clutch engagement with the axially located driven clutch member.

10. An epicyclic power transmission mechanism comprising an input shaft, two coaxial drive shafts, control means for connecting said input shaft alternatively to either of said drive shafts, an output shaft, and two epicyclic gear trains respectively coupling said drive shafts to said output shaft, said control means comprising an axially driving movable clutch member having an inner peripheral clutch surface of generally conical form mounted on said input shaft, two axially spaced driven clutch members each with an outer peripheral clutch surface for clutching engagement with said inner clutch surface and respectively connected in the drive sense with said drive shafts and mounted thereon, said driven clutch members being of different effective outer diameter and one of said driven clutch members being axially movable and the other located in the axial sense, and means to produce axial movements of said axially movable clutch members in opposite directions so that said driving clutch member can be moved into clutching engagement with the axially located driven clutch member to connect the drive from said input shaft to one of said drive shafts, and the axially movable driven clutch member can then be moved into clutching engagement with the driving clutch member to connect the drive from said input shaft to the other of said driving members in such manner that the driving clutch member is simultaneously displaced out of clutching engagement with the axially located driven clutch member.

11. An epicyclic power transmission mechanism comprising an input shaft, two alternative and coaxial drive shafts aligned with said input shaft, control means for connecting said input shaft alternatively to either of said drive shafts, an output shaft also aligned with said input shaft, and two epicyclic gear trains respectively coupling said drive shafts to said output shaft, said control means comprising an axially movable driving clutch member having an inner peripheral clutch surface of generally conical form mounted on said input shaft, two axially spaced driven clutch members each with an outer peripheral clutch surface of generally conical form for clutching engagement with said inner clutch surface and respectively connected in the drive sense with said drive shafts and mounted thereon, said driven clutch members being of different effective outer diameter and one of said driven clutch members being axially movable and the other located in the axial sense, and means to produce axial movements of said axially movable clutch members in opposite directions so that said driving clutch member can be moved into clutching engagement with the axially located driven clutch member to connect the drive to one of said coaxial drive shafts, and the axially movable driven clutch member can then be moved into clutching engagement with the driving clutch member to connect the drive to the other of said driving members in such a manner that the driving clutch member is simultaneously displaced out of clutching engagement with the axially located driven clutch member.

12. An epicyclic power transmission mechanism comprising an input shaft, an output shaft, two coaxial drive shafts positioned between said input and output shafts and in alignment therewith, a driving clutch member mounted for axial movement on said input shaft whilst rotationally coupled thereto, said driving clutch member having an internal generally conical clutch surface facing towards said output shaft, means for urging said driving clutch member towards said output shaft, a first driven clutch member axially fixed on the inner of said drive shafts with a generally conical outer clutch surface for clutching engagement with said driving clutch member, a second driven clutch member mounted for axial movement on the outer of said coaxial drive shafts with a generally coaxial outer clutch surface for clutching engagement with said driving clutch member, means for urging said second driven clutch member towards and into clutching engagement with said driving clutch member, and two independent epicyclic gear trains respectively coupling said coaxial drive shafts to said output shaft, the arrangement being such that said driven clutch members can be alternatively engaged with said driving clutch member to select a drive path through the mechanism utilising one or other of said epicyclic gear trains and when said driving clutch member is engaged with said first driven clutch member axial movement of said second driven clutch member into engagement with said driving clutch member serves to produce axial displacement of the latter member which is therefore smoothly disengaged from said first driven clutch member, thus allowing the drive path to be changed smoothly under sustained power conditions.

13. Control means for connecting a drive alternatively to either of two driving elements of an epicyclic power transmission mechanism, comprising an outer driving clutch member with an inner peripheral clutch surface of frusto-conical form, two axially spaced inner driven clutch members coaxially arranged within said outer clutch member and respectively connected to said epicyclic elements in the drive sense, each of said driven clutch members having an outer peripheral clutch surface of frusto-conical form for clutching engagement with said inner clutch surface, axial locating means for one of said driven clutch members whereby the axial movement thereof is at least limited in the axial sense, the other two of said clutch members being axially movable, means to impart relative axial movement to said driving clutch member and said one driven clutch member to bring them into clutching engagement to connect the drive to one of said epicyclic elements, and means to impart relative axial movement to said driving clutch member and tho other of said driven clutch members to bring them into clutching engagement to connect the drive to the other of said epicyclic elements, the arrangement being such that the act of clutching said other driven clutch member to said driving clutch member produce relative axial displacement between said one driven clutch member and said driving clutch member to disconnect the drive from said one epicyclic element.

14. Control means according to claim 13, wherein said means to impart relative axial movement comprise two fluid-pressure operated pistons which respectively act in opposite directions on said axially movable clutch members.

15. Control meansa according to claim 13, wherein return spring means act to urge said axially movable clutch members apart against the action of said pistons.

References Cited in the file of this patent

UNITED STATES PATENTS

| | | |
|---|---|---|
| 1,190,285 | Gouldbourn | July 11, 1916 |
| 2,175,382 | Eason | Oct. 10, 1939 |
| 2,352,478 | Halford | June 27, 1944 |
| 2,886,984 | Whelpley | May 19, 1959 |
| 2,936,865 | Tuck et al. | May 17, 1960 |